(12) United States Patent
Kitayama et al.

(10) Patent No.: US 6,428,306 B1
(45) Date of Patent: Aug. 6, 2002

(54) MOLDING MOLD

(75) Inventors: Takeo Kitayama, Ibaraki; Atsushi Takeuchi; Yasuhiro Toguchi, both of Wako; Mikihiko Kimura, Sayama, all of (JP)

(73) Assignees: Sumitomo Chemical Company, Limited; Honda Giken Kogyo Kabushiki Kaisha, both of Osaka (JP)

(*) Notice: Subject to any disclaimer, the term of this patent is extended or adjusted under 35 U.S.C. 154(b) by 0 days.

(21) Appl. No.: 09/458,102

(22) Filed: Dec. 10, 1999

(30) Foreign Application Priority Data

Dec. 10, 1998 (JP) .............................. 10-351492

(51) Int. Cl.$^7$ .............................................. B29C 45/23
(52) U.S. Cl. ........................ 425/549; 425/562; 425/564
(58) Field of Search ................... 425/562, 563, 425/564, 565, 566, 548, 549

(56) References Cited

U.S. PATENT DOCUMENTS

| | | |
|---|---|---|
| 4,043,740 A | 8/1977 | Gellert |
| 4,286,941 A | 9/1981 | Gellert |
| 4,496,131 A * | 1/1985 | Yang .......................... 425/548 |
| 4,521,179 A * | 6/1985 | Gellert ........................ 425/548 |
| 5,849,343 A * | 12/1998 | Gellert et al. ............... 425/564 |
| 6,109,910 A * | 8/2000 | Sekido ........................ 425/564 |

OTHER PUBLICATIONS

Hackh's Chemical Dictionary, p. 452, 1969.*

* cited by examiner

Primary Examiner—Tim Heitbrink
(74) Attorney, Agent, or Firm—Fitch, Even, Tabin & Flannery

(57) ABSTRACT

A mold for molding a thermoplastic resin comprising a pair of a male mold and a female mold in that a molten mass of a thermoplastic resin is supplied into a molding cavity formed by the male and female molds through a conduit for a resin melt, and after the completion of the supply of the resin, the supplied resin is shaped while shutting off the conduit for a resin melt with a pin for opening and closing the conduit for a resin melt, in which the conduit has a through-mouth of a nozzle, and a warmed conduit connected with the upstream side of the through-mouth, and the mold has a movable pin for opening and closing the conduit for a resin melt, the first heater to heat the wall of the conduit for a resin melt, and the second heater to heat the through-mouth.

9 Claims, 4 Drawing Sheets

MOLDING MOLD

BACKGROUND OF THE INVENTION

1. Field of the Invention

The present invention relates to a mold used in a molding method for thermoplastic resins. In particular, the present invention relates to a mold for molding thermoplastic resins having a narrow molding temperature range.

2. Prior Art

Thermoplastic resins can be molded by injection molding or injection-compression molding to shape products. In either molding method, a molding cavity is formed between a pair of male and female molds, and a molten thermoplastic resin, which is filled in the molding cavity, is shaped in the form of a final product only by the injection of the molten resin into the cavity, or by the injection and compression of the molten resin in the cavity.

In conventional molding molds, the downstream end of a conduit for supplying a molten resin opens into the molding cavity. A certain length of a conduit for a molten resin including such an opened portion is usually constructed in a straight form, and the upstream part of the straight conduit portion is warmed with a heater.

On the other hand, the mouth at the downstream end of the opened portion is bored through a nozzle which is formed independently from the mold, so that the heat from such a heater is not transferred to the mouth. Since the mouth generally communicates with a molding cavity, a mass of a resin remaining in the mouth (surplus part) is integrated with the body of a molded product, and removed from the mold together with the body. Therefore, the mouth has a tapered shape widening towards a molding cavity to make the removal of the surplus part easy. However, when the surface of the mouth is incompletely finished, the surplus part bites and clogs the mouth. In some cases, a sink mark is formed on the surface of a molded product opposite to the mouth region.

Under such circumstances, Japanese Patent No. 1280794 discloses a mold in which a mouth has a tapered form widening towards the upstream of a proximate conduit, and a switching pin for opening and closing the mouth has a tapered head which is exposed to an opened edge facing a mold cavity. With such a mold, no surplus part is formed in the mouth, and thus the above problems caused by a surplus part can be avoided.

However, the mold disclosed in Japanese Patent No. 1280794 cannot avoid the lowering of a nozzle temperature, and thus, under certain molding conditions, a mass of a resin may clog the mouth. In such a case, a molded product cannot be removed from the mold.

In particular, a resin having a small difference between a no-flow temperature and a decomposition temperature, that is, a resin having a narrow molding temperature range, tends to cause such clogging of the mold.

SUMMARY OF THE INVENTION

One object of the present invention is to smoothen the flow of a molten resin in a specific length of a conduit for a resin melt just before entering a molding cavity formed by a molding mold comprising a pair of a male mold and a female mold, wherein a molten thermoplastic resin is supplied into the molding cavity through the conduit for a resin melt, and then shaping the supplied resin while shutting off the conduit for a resin melt with a pin for opening and closing the conduit for a resin melt, and to prevent the clogging of the conduit by the resin at the downstream end of the conduit for a resin melt.

According to the present invention, there is provided a mold for molding a thermoplastic resin comprising a pair of a male mold and a female mold in which a molten mass of a thermoplastic resin is supplied into a molding cavity formed by the male and female molds through a conduit for a resin melt, and after the completion of the supply of the resin, the supplied resin is shaped while shutting off the conduit for a resin melt with a pin for opening and closing the conduit for a resin melt, wherein said conduit for a resin melt comprises a through-mouth of a nozzle which is formed so that it is exposed to the molding cavity, and a warmed conduit which is connected with the upstream side of the through-mouth, and said mold has a freely movable pin for opening and closing the conduit for a resin melt, which closes the conduit for a resin melt when it is tightly inserted in the whole region of the through-mouth and opens the conduit for a resin melt when it recedes from the through-mouth, the first heater which heats the wall of the conduit for a resin melt at a temperature suitable for the flowing of the thermoplastic resin when it is supplied, and the second heater which heats the through-mouth at a temperature suitable for the flowing of the thermoplastic resin when it is supplied.

When a thermoplastic resin is molded with the mold of the present invention, any surplus part, that is formed in the conventional molding molds, is not formed, since the thermoplastic resin is molded in the molding cavity while the whole region of the through-mouth is closed with the pin for opening and closing a conduit for a resin melt. Furthermore, the certain length of the conduit for a resin melt just before entering a molding cavity is maintained at a temperature suitable for the flowing of the thermoplastic resin, since the through-mouth and the warmed conduit, which are successively provided just before the molding cavity, are both heated with the heaters at specific temperatures.

In addition, a warming temperature distribution can be easily maintained at a desired distribution, since the wall of the warmed conduit and the nozzle are independently warmed.

In particular, when the nozzle has a built-in temperature sensor, and the nozzle temperature is maintained at a desired temperature based on the sensed temperature, the effects of the present invention are exalted. The effects of the present invention are further exalted when the temperature of the warmed conduit is kept at a set temperature by detecting the temperature of the warmed conduit which is heated by the second heater.

In the first preferred embodiment of the present invention, the pin for opening and closing a conduit for a resin melt is in the form of a column from its proximal end to its tip end, and the front face of the tip end is exposed to the molding cavity of the mold, and the surface of at least one of the through-mouth and the pin is coated with a smooth plated layer.

In this embodiment, the pin is tightly inserted in the through-mouth in a sliding manner, and closes the entire region of the mouth. Thus, even the fitting of a parallel bore and a column can surely close the conduit for a resin melt.

Furthermore, the supply pressure of a resin melt can be decreased, since the molten resin supplied in the molding cavity is in contact with the smooth plated surface at the downstream end of the conduit for a resin melt. In particular, when a thermoplastic resin having a narrow molding temperature range is used, the molten resin heavily adheres to the through-mouth, the wall of the warmed conduit, or the pin for opening and closing a conduit for a resin melt, but the plated layer can suppress the adhesion of the molten resin. Accordingly, the work to replace resins can be made easy and shortened.

In the second preferred embodiment, the plated layer of the first preferred embodiment comprises a three-element alloy of nickel, phosphorus and boron. Since such a plated layer can be formed by electroless plating, the plated layer is certainly formed on the inner surface of the through-mouth. In particular, such a plated layer has high heat resistance and also wear resistance. Thus, the durability of the wall of the conduit for a resin melt in such a part can be improved.

In the third preferred embodiment, the mold of the present invention has the first cooling means, which is provided in a region surrounding the mouth of the nozzle, and partly cools the specified annular region of the mold wall exposed to the molding cavity. The first cooling means can avoid the adverse influences of the heat generated by the first heater on a molded product.

In the fourth preferred embodiment, the mold of the present invention has the built-in second cooling means which partly cools the specified region of the mold wall facing the mouth of the nozzle. The second cooling means can avoid the adverse effects of the heat generated by the first heater on a molded product like the first cooling means.

In the fifth preferred embodiment, an insulating space is provided around the outer peripheries of the lower part of the nozzle and a supply tube so that the heat from the first heater and/or the second heater is not directly conducted to a region surrounding the part to which the nozzle is attached.

Further scope of applicability of the present invention will become apparent from the detailed description given hereinafter. However, it should be understood that the detailed description and specific examples, while indicating-preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or steps or group of integers or steps but-not the exclusion of any other integer or step or group of integers or steps.

DETAILED DESCRIPTION OF THE INVENTION

The molding mold of the present invention will be explained in detail by making reference to the accompanying drawings.

Figure 1:
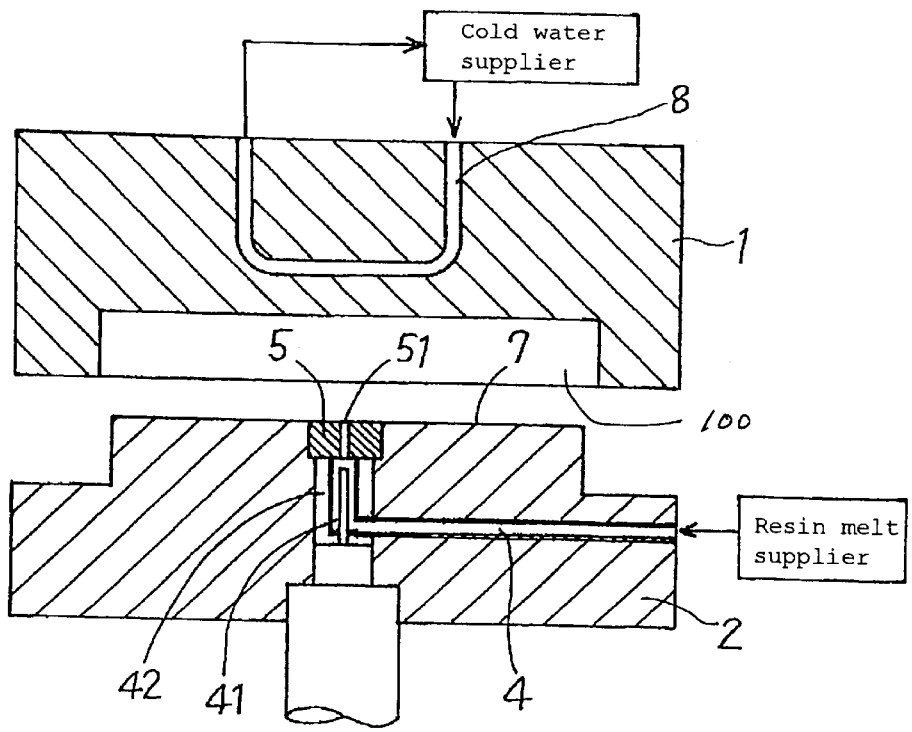
FIG. 1 is a schematic cross sectional view of a mold structure in one example of the present invention.

In general, the molding mold of the present invention comprises the female mold 1 and the male mold 2, which face each other, and are engaged together to form the molding cavity 100 between them, as shown in FIG. 1. This embodiment applies the mold of the present invention to injection-compression molding.

The male mold 2 has therein the conduit 4 for a resin melt, which opens on the cavity surface 7 of the mold exposing to the molding cavity 100. A certain length of the downstream of the conduit 4 for a resin melt forms the linear downstream conduit part 41 which intersects with the cavity surface 7.

Figure 2:
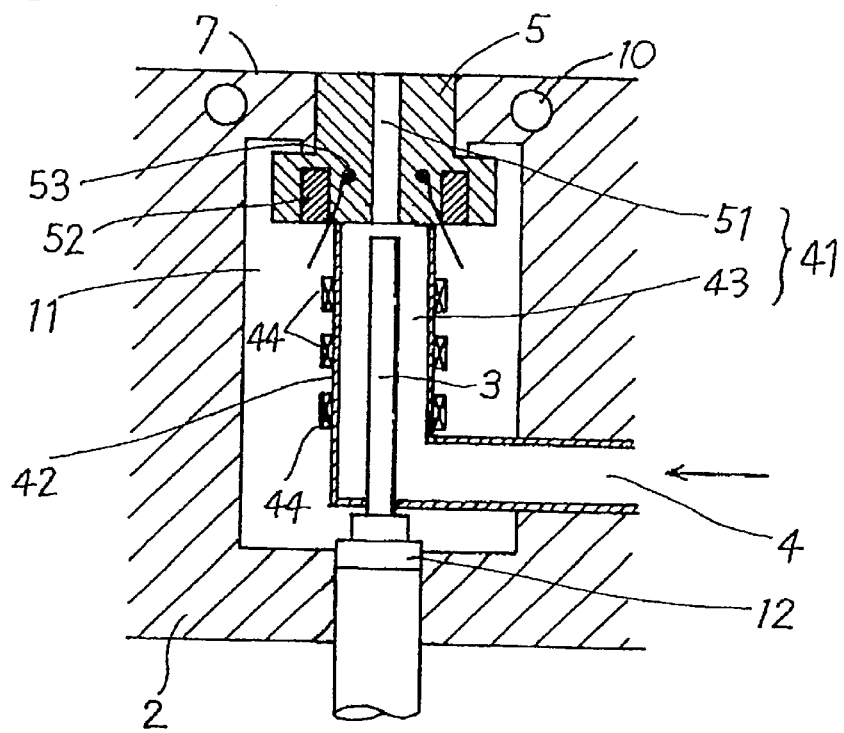
FIG. 2 is an enlarged view of a part of a male mold including the nozzle 5 and the linear downstream conduit part 41.

The nozzle 5 is provided at the downstream end of the downstream conduit part 41. The end face of the nozzle 5 is exposed to the molding cavity 100 and flush with the cavity surface 7. The through-mouth 51 is bored along the center line of the nozzle As shown in FIG. 2, the linear supply tube 42 is connected with the upstream side of the nozzle 5, and the upstream part of the conduit 4 for a resin melt is communicated and connected with the upstream end of the supply tube 42. The passage formed by the supply tube 42 constitutes the warmed conduit 43, and is warmed with the first heaters 44 wound at several areas of the supply tube 42. The nozzle 5 has the built-in second heater 52, and also the built-in sensor 53 which monitors the temperature of the nozzle 5.

The insulating space 11 is provided around the outer peripheries of the lower part of the nozzle 5 and the supply tube 42. Thus, the heat generated by the first and second heaters is not conducted directly to the peripheral region of the male mold 2, that is, a region surrounding the part of the male mold 2 to which the nozzle 5 is attached. The heat from the heaters is insulated by an air.

In this embodiment, the through-mouth 51 is in the form of a bore having a round cross section. The cylindrical pin 3 for opening and closing a conduit for a resin melt, which is concentric with the through-mouth and has an outer diameter with a fit tolerance with the inner diameter of the mouth, is provided concentrically with the downstream conduit part 41, and downwardly penetrates the wall of the conduit 4 for a resin melt. The lower end of the pin 3 is connected with the power shaft of the straight line motion means 12 such as a hydraulic cylinder or an air cylinder which is provided below the downstream conduit part 41, and advances and recedes according to the motion of the straight line motion means 12.

Figure 4:
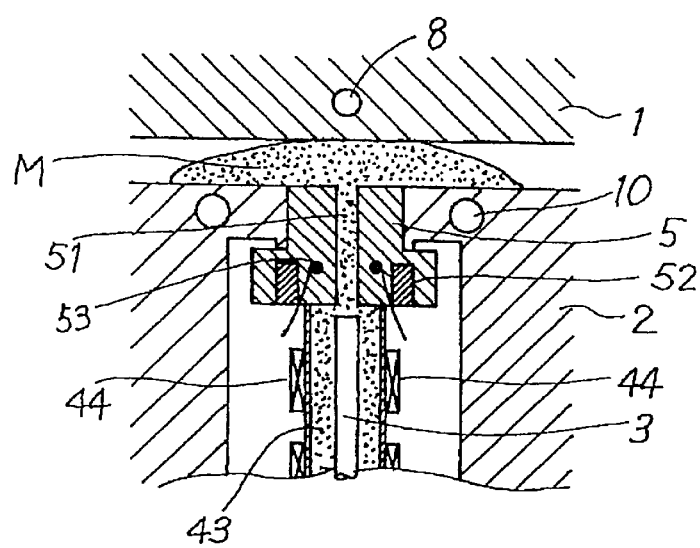
FIG. 4 is an enlarged view of a part of the mold of FIG. 3 including the nozzle 5 and neighboring regions.
Figure 6:
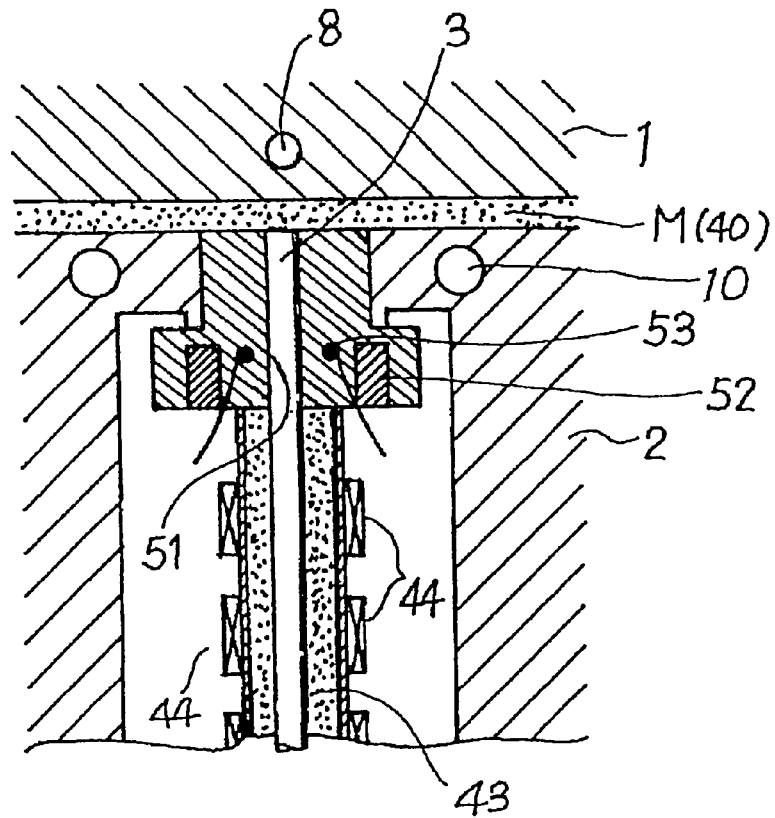
FIG. 6 is an enlarged view of a part of the mold of FIG. 5 including the nozzle 5 and neighboring regions.

When the pin 3 downwardly recedes from the through-mouth 51 as shown in FIGS. 2 and 4, the molding cavity 100 communicates with the conduit 4 for a resin melt via the through-mouth 51. When a certain length of the pin 3 from its upper end is inserted in the through-mouth 51 as shown in FIG. 6, the whole length of the through-mouth is choked, and the conduit 4 for a resin melt shuts off.

Accordingly, the pin 3 advances and recedes by the control of the straight line motion means 12, and thus the channel to supply the resin from the conduit 4 for a resin melt into the molding cavity 100 is closed and opened.

Figure 3:
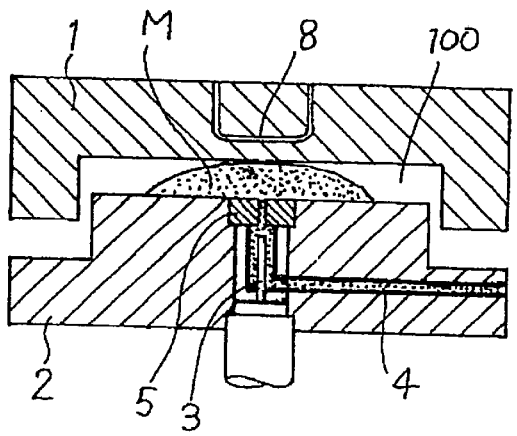
FIG. 3 is a cross sectional view of the mold of FIG. 1 when a resin melt is supplied in injection-compression molding.

When a product is shaped with the molding mold of the present invention, the pin 3 is retreated downwardly from the through-mouth 51 by the downward movement of the straight line motion means 12 while a certain gap remains between the female mold 1 and the male mold 2 as shown in FIGS. 3 and 4. Under such a condition, the resin melt M is supplied into the molding cavity 100 through the conduit 4 for a resin melt. In this step, the opening degree of the pin 3 can be controlled by the adjustment of the distance between the tip end of the pin 3 and the nozzle 5, and thus the supplied amount of the resin melt M can be controlled.

Figure 5:
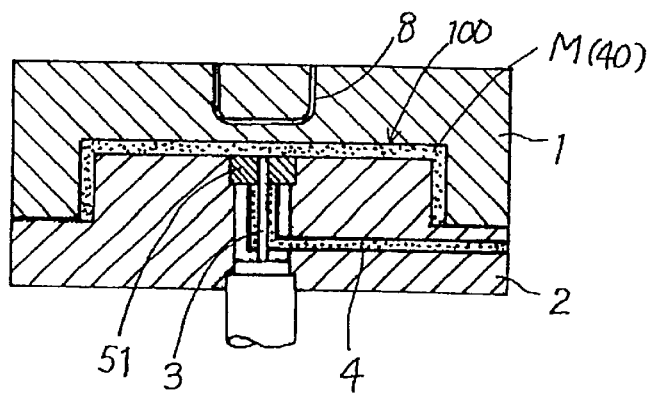
FIG. 5 is a cross sectional view of the mold of FIG. 1 after the female and male molds are closed.
Figure 7:
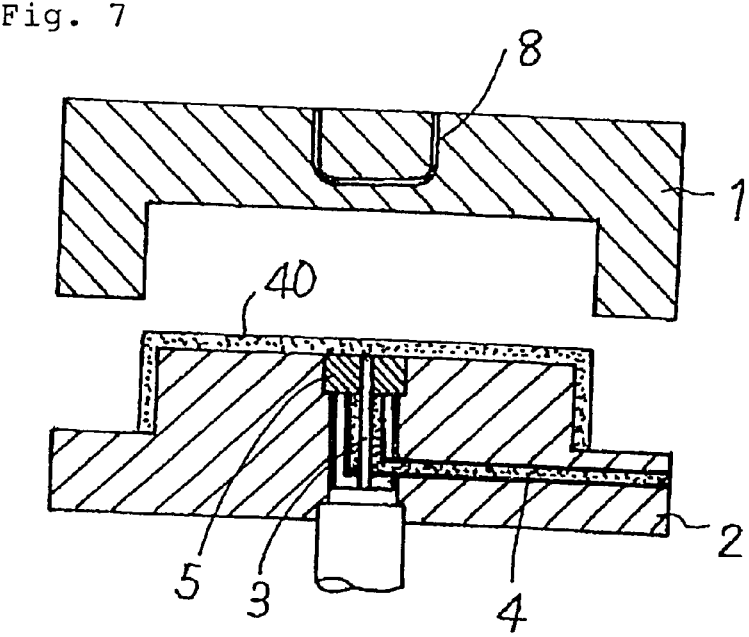
FIG. 7 is a cross sectional view of the mold of FIG. 1, when a molded product is removed after the female and male molds are opened.
Figure 8:
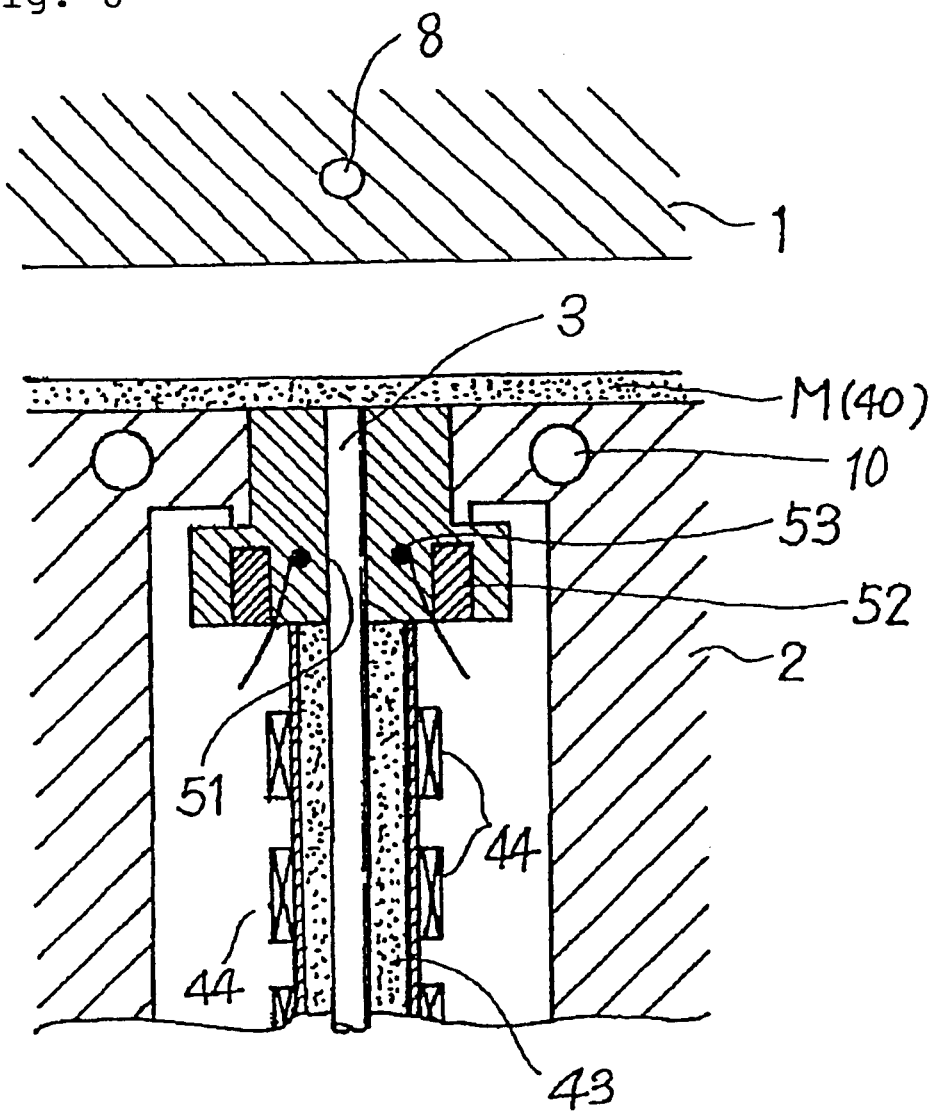
FIG. 8 is an enlarged view of a part of the mold of FIG. 7 including the nozzle 5 and neighboring regions.

When the supplied amount of the resin melt M reaches a determined amount, the straight line motion means 12 is actuated to advance the pin to the closing position (FIGS. 5 and 6), and then the female mold 1 is closed with a specified pressure. Thus, the resin melt M, which has been supplied to the molding cavity 100, is compressed to fill the molding cavity 100 which has been decreased to the final shape of a molded product. Thereafter, the mold is cooled to a determined temperature to complete the shaping, the female mold is separated from the male mold 2 as shown in FIG. 7, and the product 40 is removed from the mold.

In the course of the above molding process, the warmed conduit 43 and the nozzle 5 are heated with the first heater 44 and the second heater 52, respectively, at a temperature suitable for the flowing of the thermoplastic resin. Therefore, the resin melt M supplied through the conduit 4 for a resin melt is smoothly supplied into the molding cavity 100.

It is not preferable that the heat generated by the first heater 44 is excessively transferred to the resin melt M supplied in the molding cavity 100. According to one embodiment of the present invention, an annular cooling water passage 10 is formed in the region of the male mold around the nozzle 5 (FIG. 2) to prevent the overheating of the specific region on the mold cavity surface 7 around the periphery of the through-mouth 51.

Furthermore, the cooling water passage 8 is formed in the region of the female mold 1, which faces the through-mouth 51, and cold water is supplied to the passage 8 from a cold water supplier. Thus, this region is cooled to a specific temperature depending on the kind of resin. Accordingly, the cooling rate of the molded product is enhanced. In addition, the molding defects due to the overheating of this region can be prevented.

The warming temperature maintained with the first heater 44 and the second heater 52 is set at a specific temperature in accordance with the kind of the resin, etc.

In particular, the warming temperature of the nozzle 5 with the second heater 52 may be in the range between 30° C. and 300° C., and depends on the kind of used resins, the diameter of the thorough-mouth 51, etc. Preferably, the warming temperature of the nozzle 5 with the second heater 52 is around 100° C. This temperature is regulated by the on-off control of the second heater 52 using the feed back control in accordance with the output from the sensor 53.

The diameter of the through-mouth is usually from 1.5 mm to 15 mm, preferably from 5 mm to 10 mm.

In a preferred embodiment, the surfaces of the through-mouth 51 and the pin 3 for opening and closing the conduit are plated, and the plated layers slide on each other with a fit tolerance of a degree to seal the resin melt. The plated layers can suppress the adhesion of the resin melt to the through-mouth 51 and the pin 3.

The plated layer may be formed on either the surface of the through-mouth 51 or the surface of the pin 3. Furthermore, all the surfaces of parts, which are in contact with the resin melt, may be plated.

The plating may be chromium electroplating, nickel electroless plating, etc. insofar as a plated film has desired heat resistance. Electroless plating is preferred to surely plate the through-mouth 51. In the case of electroplating, it is difficult to plate a bore portion, but electroless plating does not have such a drawback. A plated layer is advantageously a plated layer of a three-element alloy of nickel, phosphorus and boron, since it has good heat resistance and wear resistance.

The cross section of the pin 3 for opening and closing a conduit for resin melt may be a circle, an ellipsoid or a polygon. In the case of a cross section other than a circle, it is possible to open and close the conduit 4 for a resin melt, when a pair is a pair based on the movement of the pin in which the pin is paired with the conduit 4 such that the pin can freely move in the direction of its axis.

The nozzle 5 is preferably made of a beryllium-copper alloy. Alternatively, a ceramic pin may be used as the pin 3 for opening and closing a conduit for a resin melt, when the pin is not plated.

The driving force of the straight line motion means 12 to push up the pin 3 for opening and closing a conduit for a resin melt is preferably larger than a closing pressure of the female mold 1 and the male mold 2, when the driving force is converted to a pressure.

The upper face of the pin 3 for opening and closing a conduit for a resin melt is not always flat. The upper face may slightly protrude over or set back from the flush plane with the mold cavity surface 7, insofar-as the upper face is exposed to the molding cavity 100.

In the above-described embodiments, the mold of the present invention is used in the injection-compression molding. Needless to say, the mold of the present invention can be used in general injection molding.

Thermoplastic resins used in the molding with the mold of the present invention may be those used in conventional injection, molding, extrusion, stamping, etc. Examples of thermoplastic resins include polyolefin resins (e.g. polyethylene, polypropylene, etc.), common thermoplastic resins (e.g. polystyrene, polycarbonate, acrylonitrile-styrene-butadiene block copolymer, polyamide (Nylon), etc.), thermoplastic elastomers (e.g. ethylene-propylene block copolymer, styrene-butadiene block copolymer, etc.), and polymer alloys of these resins.

In particular, the mold of the present invention is advantageously used to mold resins having a small difference between a no-flow temperature and a decomposition temperature, that is, a resin having a narrow molding temperature range, for example, PPE/PA, ABS/PC, ABC/PA, etc.

The mold of the present invention achieves the following effects:

A sink mark is hardly formed on the surface of a molded product opposite to the through-mouth region, since no surplus part is formed.

Since a specific length of a conduit for a resin melt just before entering a molding cavity can be maintained at a determined temperature, the clogging of a nozzle with a resin caused by the lowering of the nozzle temperature can be avoided. Furthermore, a warming temperature distribution along the conduit can be easily controlled since the nozzle and the wall of the warmed conduit are independently heated.

What is claimed is:

1. A mold for molding a thermoplastic resin comprising:
a pair of a male mold and a female mold in which a molten mass of thermoplastic resin is supplied into a molding cavity formed by the male and female molds through a conduit for a resin melt, and after the completion of the supply of the resin, the supplied resin is shaped while shutting off the conduit for a resin melt with a movable pin for opening and closing the conduit for a resin melt, said conduit for a resin melt comprising a through-mouth of a nozzle which is formed so that it is exposed to the molding cavity, said through-mouth having an upstream and downstream side, and a warmed conduit which is connected with the upstream side of the through-mouth, and said movable pin closes the conduit for a resin melt when it is inserted in the whole region of the through-mouth and opens the conduit for a resin melt when it recedes from the through-mouth, a first heater which heats the wall of the conduit for a resin melt at a temperature suitable for the flowing of the thermoplastic resin when it is supplied, and a second heater which heats the through-mouth at a temperature suitable for the flowing of the thermoplastic resin when it is supplied.

2. the mold according to claim 1, wherein said pin for opening and closing a conduit for a resin melt is in the form of a column from its proximal end to its tip end, and the front face of the tip end is exposed to the molding cavity of the mold, and the surface of at least one of the through-mouth and the pin is coated with a plated layer.

3. The mold according to claim 1, wherein said mold further comprises a first cooling means, which is provided in a region surrounding the mouth of the nozzle, and cools an annular region of the mold wall exposed to the molding cavity.

4. The mold according to claim 1, wherein an insulating space is provided around the outer peripheries of the lower part of the nozzle and a supply tube so that the heat from said first heater and/or said second heater is not directly conducted to a region surrounding the part to which the nozzle is attached.

5. The mold according to claims 1, 2 or 3, wherein said mold further comprises a built-in second cooling means which cools a region of the mold wall facing the mouth of the nozzle.

6. A mold for molding a thermoplastic resin comprising:

a pair of a male mold and a female mold in which a molten mass of a thermoplastic resin is supplied into a molding cavity formed by the male and female molds through a conduit for a resin melt, and after the completion of the supply of the resin, the supplied resin is shaped while shutting off the conduit for a resin melt with a movable pin for opening and closing the conduit for a resin melt, said conduit for a resin melt comprising a through-mouth of a nozzle which is formed so that it is exposed to the molding cavity, said through-mouth having an upstream and downstream side, and a warmed conduit which is connected with the upstream side of the through-mouth, and said movable pin, closes the conduit for a resin melt when it is inserted in the whole region of the through-mouth and opens the conduit for a resin melt when it recedes from the through-mouth, a first heater which heats the wall of the conduit for a resin melt at a temperature suitable for the flowing of the thermoplastic resin when it is supplied, and a second heater which heats the through-mouth at a temperature suitable for the flowing of the thermoplastic resin when it is supplied, wherein said pin for opening and closing a conduit for a resin melt is in the form of a column from its proximal end to its tip end, and the front face of the tip end is exposed to the molding cavity of the mold, and the surface of at least one of the through-mouth and the pin is coated with a plated layer.

7. The mold according to claim 6, wherein said mold further comprises a first cooling means, which is provided in a region surrounding the mouth of the nozzle, and cools an annular region of the mold wall exposed to the molding cavity.

8. The mold according to claim 7, wherein said mold further comprises a built-in second cooling means, which cools a region of the mold wall facing the mouth of the nozzle.

9. The mold according to claim 1 or 6, wherein said plated layer comprises a three-element alloy of nickel, phosphorus and boron.

* * * * *